United States Patent [19]

Lee et al.

[11] Patent Number: 4,562,112

[45] Date of Patent: Dec. 31, 1985

[54] POLYIMIDE FOAM AND PROCESS FOR THE PREPARATION OF SAME

[75] Inventors: Raymond Lee, Elk Grove Village; Gregory A. Ferro, Mt. Prospect; David W. Okey, Downers Grove, all of Ill.

[73] Assignee: Imi-Tech Corporation, Elk Grove Village, Ill.

[21] Appl. No.: 696,007

[22] Filed: Jan. 29, 1985

[51] Int. Cl.[4] ............................ B32B 5/14; B32B 5/18
[52] U.S. Cl. ................................ 428/318.6; 264/321; 428/318.8; 521/51; 521/185
[58] Field of Search ..................... 264/321; 428/318.6, 428/318.8; 521/51, 185

[56] References Cited

U.S. PATENT DOCUMENTS 3,906,137 9/1975 Bauer .................................. 264/321

Primary Examiner—William J. Van Balen
Attorney, Agent, or Firm—McDougall, Hersh & Scott

[57] ABSTRACT

A polyimide and a process for its preparation wherein the polyimide is prepared from reaction of an organic tetracarboxylic acid or derivative thereof with a mixture of an aromatic diamine and an amine-terminated butadiene-nitrile copolymer. The polyimides of the invention are particularly useful in the preparation of flexible foams.

23 Claims, No Drawings

POLYIMIDE FOAM AND PROCESS FOR THE PREPARATION OF SAME

This invention relates to polyimide foams and more particularly to closed cell polyimide foams having a flexible, hydrophobic, non-porous, vapor impermeable skin on one surface thereof.

It is known, as is described in U.S. Pat. Nos. 3,966,652 and 4,315,076, that polyimides can be produced which are hydrolytically stable and which have improved fire resistance properties, giving off essentially no smoke or toxic fumes when exposed to flame.

Foams of the type there described are useful in aircraft cabins, space vehicles, land and sea transport equipment, as well as other applications where relatively non-flammable and negligible smoke-emitting characteristics are desirable.

In the practice of the prior art as described above, such polyimide foams are prepared by reacting an alkyl diester of a tetracarboxylic acid with one or more aromatic and/or heterocyclic diamines. Typically, a tetracarboxylic dianhydride is reacted with methanol or ethanol to form the corresponding diester which is then reacted with the amine or amines to form the corresponding polyamide-acid/ester which can then be converted to a polyimide by further heating. As a general rule, a cellular structure is developed, because both water and a lower alkyl alcohol corresponding to the alcohol portion of the ester is generated in situ during the reaction. These volatile materials produce open cell polyimide foams which are flexible and resilient and have fine, homogeneous cellular structure.

While amines of the type described above represent a significant advance in the art, their properties when used in insulation in applications involving high humidity are not as great as might be desired. Specifically, foams produced in accordance with the foregoing concepts possess an open cellular structure and therefore do not have significantly high vapor-barrier qualities to facilitate their use in, for example, fire-resistant, anti-sweat submarine hull insulation.

It is known, as described by St. Clair et al. in *Int. J. Adhesion and Adhesives*, 249–50 (July, 1981), that adhesives can be prepared by reaction of tetracarboxylic acid dianhydride with amine-terminated butadiene acrylonitrile to produce polyimide adhesives. Because of the viscosity and molecular weight of such amine-terminated butadiene-acrylonitrile copolymers, such amines are not capable of reaction with tetracarboxylic acid dianhydrides to provide flexible, resilient closed cell foams.

It has been found, as described in copending application Ser. No. 596,298, filed Apr. 3, 1984, that significantly improved vapor barrier characteristics can be imparted to polyimide foams when the foams are prepared by reaction of a tetracarboxylic acid dianhydride dimethylester with a combination of an aromatic diamine and an amine-terminated copolymer of butadiene and acrylonitrile. It has been found that polyimides prepared from such a reaction mixture cannot only be foamed but produce foams which can be used under conditions of high humidity to provide vapor barrier qualities.

While the polyimide foams produced in accordance with the teachings of the foregoing pending application provide significantly improved results, there is nevertheless room for further improvements to provide a coating on the foam which is not only flexible but also provides an effective vapor barrier.

It is accordingly an object of the present invention to provide polyimide foams which can be used under conditions of high humidity to provide high vapor-barrier characteristics.

It is a more specific object of the present invention to provide a polyimide foam and a process for its preparation wherein the polyimide foam has a flexible, hydrophobic, non-porous, vapor-impermeable skin on one surface thereof.

The concepts of the present invention reside in a polyimide foam and a process for its preparation in which a polyimide foam is treated to provide a flexible, non-porous vapor impermeable skin on one surface thereof. In accordance with the practice of invention, a polyimide foam is first produced by foaming a prepolymer prepared by reaction of an organic tetracarboxylic acid or its adhydride or ester derivative with an aromatic diamine and an organic diamine containing at least 50% by weight of a conjugated diene. The flexible foam thus produced is then treated by heating at least one surface of the foam to coalesce the cells of the foam polyimide on said surface to form a flexible, non-porous, vapor-impermeable skin on that surface. It has been surprisingly found that the skin thus formed on the surface has a reduced water vapor transmission rate and is unexpectly flexible and tough.

The discovery that polyimide foams of the type described can be treated to form a virtually vapor-impermeable, non-porous skin on one surface by heating the cells thereof to coalesce them is an unexpected discovery in light of the existing knowledge in the art. It has been attempted, in the past, to form a skin on polyimide foams, but acceptable results have not yet heretofore been achieved, primarily because of the tendency of the foam, upon contact with the hot surface to effect the melting and coalescense of the polyimide foam, tends to become brittle, and thus any skin that is formed cracks and has a pronounced tendency to crack and break under pressure. The skin formed in accordance with the principles of this invention not only provides the desired vapor barrier characteristics, but also remains flexible over a wide range of operating temperatures.

In the practice of the invention, the polyimide foam on which a skin is formed is one prepared by reaction of an organic tetracarboxylic acid or its anhydride or ester derivative with an aromatic diamine and an organic diamine which is an amine-terminated polymer of at least 50% by weight of a conjugated diene, either alone or copolymerized with at least one vinyl monomer copolymerized therewith. Such copolymers can be end blocked with an aliphatic or aromatic unsaturated amine to provide the desired amine termination. A number of vinyl monomers copolymerizable with a conjugated diene may be used including styrene as well as substituted styrenes, such as alphamethylstyrene and various other substituted styrenes. In addition, use can also be made of acrylonitrile, methacrylonitrile and combinations thereof. As the conjugated diene, use can be made of butadiene as well as other well-known conjugated dienes such as chloroprene, isoprene, and the like.

The copolymer of the conjugated diene and the vinyl monomer, when the amine-terminated copolymer contains a vinyl monomer, is preferably one formed by free radical polymerization. Typically, the conjugated diene polymer or copolymer has a low molecular weight, preferably less than about 3000 to insure that it is sufficiently fluid to react in the formation of the polyimide as well as sufficiently fluid so as to be capable of foaming. The resulting polymer or copolymer can then be end-capped with either aromatic or aliphatic unsaturated amines in accordance with conventional techniques.

In the preferred practice of the invention, the amine-terminated butadiene-nitrile copolymer has the general formula:

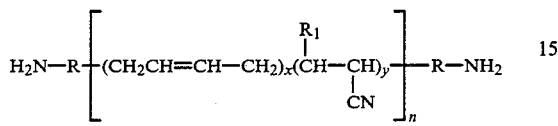

wherein R is either a phenylene group or an alkylene group, $R_1$ is hydrogen or methyl, and x and y are each independently integers ranging from 1 to 25 and n is an integer, preferably below 20.

In this preferred embodiment of the invention, the amine-terminated butadiene-nitrile copolymer is a butadiene-nitrile rubber wherein butadiene constitutes at least 50 percent by weight of the total of the butadiene and nitrile. The nitrile monomer copolymerized with the butadiene can either by acrylonitrile or methacrylonitrile and the polymerization reaction can be carried out in accordance with conventional free radical polymerization techniques. The copolymer produced is a random copolymer containing both butadiene and acrylonitrile or methacrylonitrile in the polymer backbone. The amine functionality is introduced by end-capping of the copolymer with, for example, para-aminostyrene or allylamine in accordance with conventional techniques.

In the preferred practice of the invention, the organic tetracarboxylic acid in the form of its diester from methanol or ethanol is reacted with one of the foregoing diamines, either alone or in combination with other amines to form a polyamide-acid/ester prepolymer which can be foamed and cured, either alone or in the presence of a blowing agent, to provide the desired polyimide foam.

The tetracarboxylic acids or derivatives thereof preferably employed in the practice of the invention are those having the general formula:

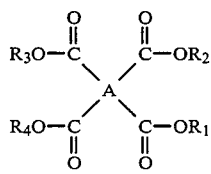

wherein A is a tetravalent organic group and $R_1$ to $R_4$, inclusive, are each selected from the group consisting of hydrogen and lower alkyl, and preferably methyl, ethyl or propyl. The tetravalent organic group A is preferably one having one of the following structures:

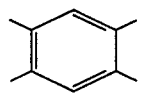 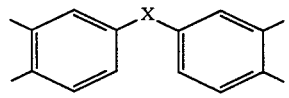

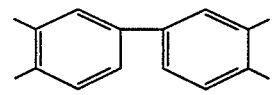

wherein X is one or more of the following:

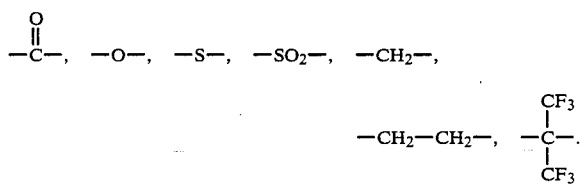

Preferred among the tetracarboxylic acid and derivatives thereof is 3,3', 4,4'-benzophenone tetracarboxylic acid and its corresponding lower alkyl (preferably lower dialkyl) esters.

As the organic diamine, use is preferably made of one or more aromatic and/or heterocyclic diamines which are themselves known to the art. Such aromatic diamines can be represented by the structure:

$$H_2N-R_2-NH_2$$

wherein $R_2$ is an aromatic diamine group containing 5 to 16 carbon atoms and containing up to one hetero atom in the ring, the hetero atom being selected from the group consisting of —N—, —O— and —S—. Also included herein are those $R_2$ groups wherein $R_2$ is a diphenyl group or a diphenylmethane group. Representative of such diamines are:

2,6-diaminopyridine
3,5-diaminopyridine
3,3'-diaminodiphenyl sulfone
4,4'-diaminodiphenyl sulfone
4,4'-diaminodiphenyl sulfide
3,3'-diaminodiphenyl ether
4,4'-diaminodiphenyl ether
meta-phenylene diamine
para-phenylene diamine
p,p'-methylene dianiline
2,6-diamino toluene
2,4-diamino toluene It is also possible, and sometimes desirable in the preparation of the polyamide-acid/ester prepolymer, to include in the reaction mixture one or more aliphatic diamines. Such aliphatic diamines are preferably alphaomega diaminoalkanes having the general formula:

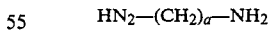

wherein a is an integer from 2 to 16. Representative of such diamines include 1,3-diaminopropane, 1,4-diaminobutane, 1,5-diaminopentane, 1,6-diaminohexane, etc.

In place of the foregoing aliphatic amines, use can also be made of the polyamines marketed by Texaco Chemical Company under the trademark JEFFAMINE. Those amines can be described as polyoxypropylene amines, and have the formula:

wherein x varies from 1 to about 5.

In accordance with one preferred embodiment of the invention, the polyamide-acid/ester prepolymer is formed by reaction of a dialkyl ester of the organic tetracarboxylic acid with the amines described above. The relative proportions used in the preparation of the prepolymer can be varied to relatively wide limits to provide good foams. In general, it is preferred to employ between 0.5 to 1.5 total moles of amine per mole of the tetracarboxylic acid dianhydride or ester derivative thereof. The aromatic amine generally constitutes from 92.5 to 99.9999 mole % based on the number of moles of the tetracarboxylic acid or derivative, while the proportion of the amine-terminated diene polymer constitutes 0.0001 to 7.5 mole % based on the total moles of tetracarboxylic acid or derivative thereof.

It is also possible, and sometimes preferred, to employ a combination of aromatic amines, as described above, which is carbocyclic with an N-heterocyclic amine of the sort described above in addition to the amine-terminated butadiene-nitrile copolymer.

It is also possible to employ, as a fourth amine component, the aliphatic amine described above. When the aliphatic amine is employed, it is generally used in an amount ranging from 1 to 40 percent based on the total moles of the acid anhydride or ester employed.

In the preparation of the prepolymer, the tetracarboxylic acid dianhydride derivative, usually in the form of the diester, is reacted with the diamine or diamines at a temperature below the reflux temperature of the reaction mixture. Without limiting the invention as to theory, it is believed that the prepolymer is formed of a low-molecular weight polyamide-acid/ester which can then be heated to complete the polymerization reaction. The prepolymer can thus be in the form of a liquid or a solid having a low molecular weight, so long as it is capable of being converted by further reaction to a high-molecular weight polyimide polymer.

When using a lower alkyl ester of the tetracarboxylic acid, the resulting alcohol produced in the reaction as well as the water released during the reaction can be used as the blowing agent during polymerization to form the desired polyimide foams. Alternatively, use can be made of any of a variety of blowing agents, such as the solid blowing agents described in co-pending application Ser. No. 532,663, filed Sept. 16, 1983, the disclosure of which is incorporated herein by reference.

As there described, the homogeneity of the cellular structure of the resulting polyimide foam can be more accurately controlled by controlling the particle size of the solid blowing agent, when such a blowing agent is employed. It has been found that the particle size of the solid blowing agent is preferably less than 200 microns in diameter, with 98% of the blowing agent particle sizes being less than 150 microns in diameter.

In the practice of the invention, it is possible to include in the reaction mixture various filler and/or reinforcing materials. For example, graphite, glass and other synthetic fibers can be added to the composition to produce a fiber-reinforced product. It is frequently desirable to employ a surfactant, thereby increasing bubble stability and the uniformity of the cellular structure, to increase the fatigue resistance of the foam and to make the foam more flexible and resilient. Such surfactants are themselves conventional, and form no part of the present invention.

The temperatures at which the prepolymer is converted to the polyimide polymer are generally those temperatures used in the preparation of other polyimide polymers. As a general rule, temperatures ranging from 200° to 400° C. can be used, with heating times ranging from 5 to 60 minutes or longer. As those skilled in the art will appreciate, the time for carrying out the reaction is somewhat dependent on the reaction temperature, higher temperatures enabling the use of shorter reaction times. It is also possible to heat to a lower temperature in the first stage of the reaction and than higher temperatures in the later stages.

Heating can be carried out in a conventional oven if desired. Alternatively, the foaming and curing of the prepolymer into a polyimide polymer can be effected by means of microwave heating. It has been found that the prepolymer can be converted to the corresponding polyimide foam by exposing the prepolymer for 1 to 120 minutes to radio frequencies within the range 915 to 2450 mHz, with the power output ranging from 1 to 100 kw. The power output to prepolymer weight ratio generally reads from about 0.1 to 100 kw per kg.

Once the foam has been produced, the flexible, non-porous vapor-impermeable skin is formed on at least one surface thereof by heating the surface under conditions of temperature and pressure sufficient to melt the surface of the foam and cause the cells thereof to coalesce and thereby form the skin on the surface.

In the preferred practice of the invention, the foam is contacted with a heated surface at a pressure sufficient to cause the cells of the foam to coalesce and for a time sufficient to cause complete melting and solidification of the polyimide thus melted into the skin.

In the preferred practice of the invention, the surface of the foam is heated to a temperature within the range of 225°-320° C., and preferably 260° to 290° C. To effect the heating of the foam and thus cause coalescence of the cells, use is preferably made of a heated platen fabricated of either a metal or metal-coated with a non-stick material such as teflon. Also suitable for use in the invention are teflon-coated glass cloths which are heated to the desired temperature and contacted with foam.

It is generally sufficient that the foam be contacted with the heated surface for a period of at least 0.75 minutes, and generally within the range of 1 to 5 minutes, with 3 to 4 minutes being preferred, depending in part on the thickness of the skin desired. As will be appreciated by those skilled in the art, both shorter and longer contact times can be employed. In general, a slight positive pressure of the heated surface on the surface of the foam is desirable to accelerate the melting and coalescence of the foam. In general, pressures of 0.25 to 5 psi can be used for that purpose.

Having described the basic concepts of the invention, reference is now made to the following example which is provided by way of illustration, but not by way of limitation, of the practice of the invention.

EXAMPLE 1

This example illustrates the practice of the present invention in the use of the amine-terminated butadiene-acrylonitrile copolymer.

To 322.23 g (1 mole) of benzophenontetracarboxylic acid dianhydride (BTDA) add 240 ml of methanol ($CH_3OH$) and 24 ml of $H_2O$. The reactants are slurried and then heated to reflux, 67°-72° C., to form the methyl ester of benzophenonetetracarboxylic acid. After esterification is complete, 0.654 g of the the amine-terminated butadieneacrylonitrile copolymer is added to the refluxing solution and mixed, under reflux conditions, for 30 to 180 minutes. The remaining diamines (2,6-diaminopyridine (32.70 g) and p,p'-methylenedianiline (138.45g)) are then added individually and allowed to mix for 15 minutes before the addition of the next diamine while maintaining the batch temperature above 60° C.

Following the addition of the last diamine, the reaction mixture is heated to between 60°–65° C. for 5 to 200 minutes. After the reaction is complete, the mixture is cooled to 60° C., and 11.53 g of a surfactant is added. Conversion to powder is accomplished by drying for 90 to 120 minutes at 65° C., then at 65° C. and 128 mm Hg pressure from 45 to 75 minutes, then at 65° C. and 26 mm Hg pressure from 45 to 75 minutes. The resulting friable material is then pulverized and passed through a 600 micron seive.

Foams are prepared by exposure to microwave energy (1.4 to 100 kw) for 6 to 200 minutes and then cured for 30 to 200 minutes at 232°–300° C.

The skin on the foam thus produced is prepared as follows:

An electrically heated platen press is heated to between 225° and 320° C. Only the bottom platen is heated and the top is maintained at room temperature. The platens are either coated with teflon or a sheet of telfon-coated glass cloth is placed on top of the platen. A piece of room temperature foam is contacted with the hot surface and held for a specified period of time under very low pressure. A series of foams were treated in like manner, but for increasing contact time. This results in increasing skin thickness as contact time increases, but the improvement upon water vapor transmission rate (WVTR) is small.

| Experiment | Contact Time (Sec) | WVTR (Perm-in) |
|---|---|---|
| Control | — | 45.0 |
| I | 10 | 34.2 |
| II | 25 | 30.0 |
| III | 30 | 30.0 |

The skins produced are thin and flexible with small improvement in WVTR.

EXAMPLE 2

This example illustrates the use of longer contact times and greater pressures to provide a thicker skin and hence a greater decrease in the WVTR using the foam produced as described in Example 1.

An electrically heated platen press is heated to between 225° and 320° C., with only the bottom platen heated. The platens are covered with a teflon coating or a sheet of teflon-coated glass cloth. A piece of foam, at room temperature, of the desired thickness is placed in the press. The platens are then closed to the desired final thickness and held for 1 to 5 minutes.

| Experiment | Initial Thickness (in) | Final Thickness (in) | Force (psi) | Skin Thickness (in) | WVTR (Perm-in) |
|---|---|---|---|---|---|
| Control | — | — | — | — | 45.0 |
| IV | 1.50 | 1.0 | 0.6 | 0.050 | 15.6 |
| V | 1.75 | 1.0 | 0.9 | 0.065 | 14.2 |
| VI | 2.00 | 1.0 | 1.2 | 0.080 | 8.2 |

As can be seen, the above foams IV, V and VI have drastically improved vapor impermeability as shown by reduced WVTR values.

EXAMPLE 3

Using the same procedure described in Example 1, a polyimide foam is produced with an amine-terminated copolymer of butadiene and styrene containing 55% by weight butadiene and end-blocked with para-aminostyrene.

Skins produced on the resulting foams likewise showed a significant improvement in the vapor-impermeability of the foam.

It will be understood that various changes and modifications can be made in the details of procedure, formulation and use without departing from the spirit of the invention, especially as defined in the following claims.

We claim:

1. A polyimide foam article having a flexible, hydrophobic, non-porous, vapor-impermeable skin on one surface thereof comprising a polyimide foam prepared by foaming a prepolymer prepared from (a) an organic tetracarboxylic acid or its anhydride or ester derivative, (b) an aromatic diamine having the formula:

$$H_2N-R_2-NH_2$$

wherein $R_2$ is an aromatic group containing 5 to 16 carbon atoms and (c) an organic liquid diamine containing at least 50% by weight of a conjugated diene, said skin produced by heating at least one surface of the foam to coalesce the polyimide on the surface to form the flexible, non-porous, vapor-impermeable skin on the surface.

2. A foam as defined in claim 1 wherein the organic diamine is an amine-terminated polymer of at least 50% by weight of a conjugated diene alone or copolymerized with at least one vinyl monomer copolymerizable therewith which is end blocked with an aliphatic or aromatic amine.

3. A foam as defined in claim 2 wherein the vinyl monomer is selected from the group consisting of styrene, acrylonitrile, methacrylonitrile, and combinations thereof.

4. A foam as defined in claim 1 wherein the tetracarboxylic acid is a di(loweralkyl) ester of benzophenone tetracarboxylic acid.

5. A foam as defined in claim 1 wherein the tetracarboxylic acid derivative is a compound having the formula:

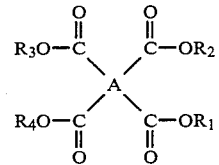

wherein A is a tetravalent organic group and $R_1$ to $R_4$ are each selected from the group consisting of hydrogen and lower alkyl.

6. A foam as defined in claim 1 wherein the aromatic diamine is methylene dianiline.

7. A foam as defined in claim 1 which includes at least one aromatic and at least one heterocyclic diamine.

8. A foam as defined in claim 1 which includes at least one aliphatic diamine.

9. A foam as defined in claim 1 wherein the surface of the foam is contacted with a heated surface under conditions of heat and pressure sufficient to coalesce the cells of the foam to form the flexible, non-porous, vapor-impermeable skin.

10. A foam as defined in claim 1 wherein the surface is heated to a temperature within the range of 225° to 320° C.

11. A method for preparing a polyimide foam having a flexible, non-porous skin on one surface thereof comprising the step of heating at least one surface of a polyimide foam under conditions of heat and pressure sufficient to melt the surface of the foam and cause the cells thereof to coalesce to form a flexible, non-porous, vapor-impermeable skin, the polyimide foam being prepared from (a) an organic tetracarboxylic acid or its anhydride or ester derivative, (b) an aromatic diamine having the formula:

$$H_2N-R_2-NH_2$$

wherein $R_2$ is an aromatic group containing 5 to 16 carbon atoms and (c) an organic liquid diamine containing at least 50% by weight of a conjugated diene, said skin produced by heating at least one surface of the foam to coalesce the polyimide on the surface to form the flexible, non-porous, vapor-impermeable skin on the surface.

12. A method as defined in claim 11 wherein the foam is contacted with a heated surface at a pressure sufficient to cause the cells of the foam to coalesce to form the skin.

13. A method as defined in claim 11 wherein the surface of the foam is heated to a temperature within the range of 225° to 320° C.

14. A method as defined in claim 13 wherein the foam is heated for at least 0.75 minutes.

15. A method as defined in claim 11 wherein the organic diamine is an amine-terminated polymer of at least 50% by weight of a conjugated diene alone or copolymerized with at least one vinyl monomer copolymerizable therewith which is end blocked with an aliphatic or aromatic amine.

16. A method as defined in claim 11 wherein the vinyl monomer is selected from the group consisting of styrene, acrylonitrile, methacrylonitrile, and combinations thereof.

17. A method as defined in claim 11 wherein the tetracarboxylic acid is a di(loweralkyl) ester of benzophenone tetracarboxylic acid.

18. A method as defined in claim 11 wherein the aromatic diamine is methylene dianiline.

19. A method as defined in claim 11 which includes at least one aromatic and at least one heterocyclic diamine.

20. A method as defined in claim 11 which includes at least one aliphatic diamine.

21. A process as defined in claim 11 wherein the organic liquid diamine is selected from the group consisting of a polymer having the formula:

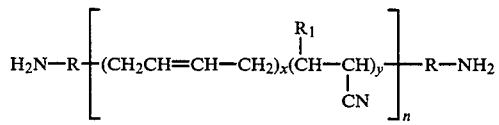

wherein R is either a phenylene group or an alkylene group, $R_1$ is hydrogen or methyl, x and y are each independently integers ranging from 1 to 25 and n is an integer, preferably below 20.

22. A process as defined in claim 11 wherein the foam is prepared in the presence of a solid blowing agent.

23. A process as defined in claim 11 wherein the aromatic diamine is diaminopyridine.

* * * * *